Aug. 23, 1955  L. PENSAK  2,716,188
STORAGE TUBE AND CIRCUIT
Filed Oct. 31, 1950
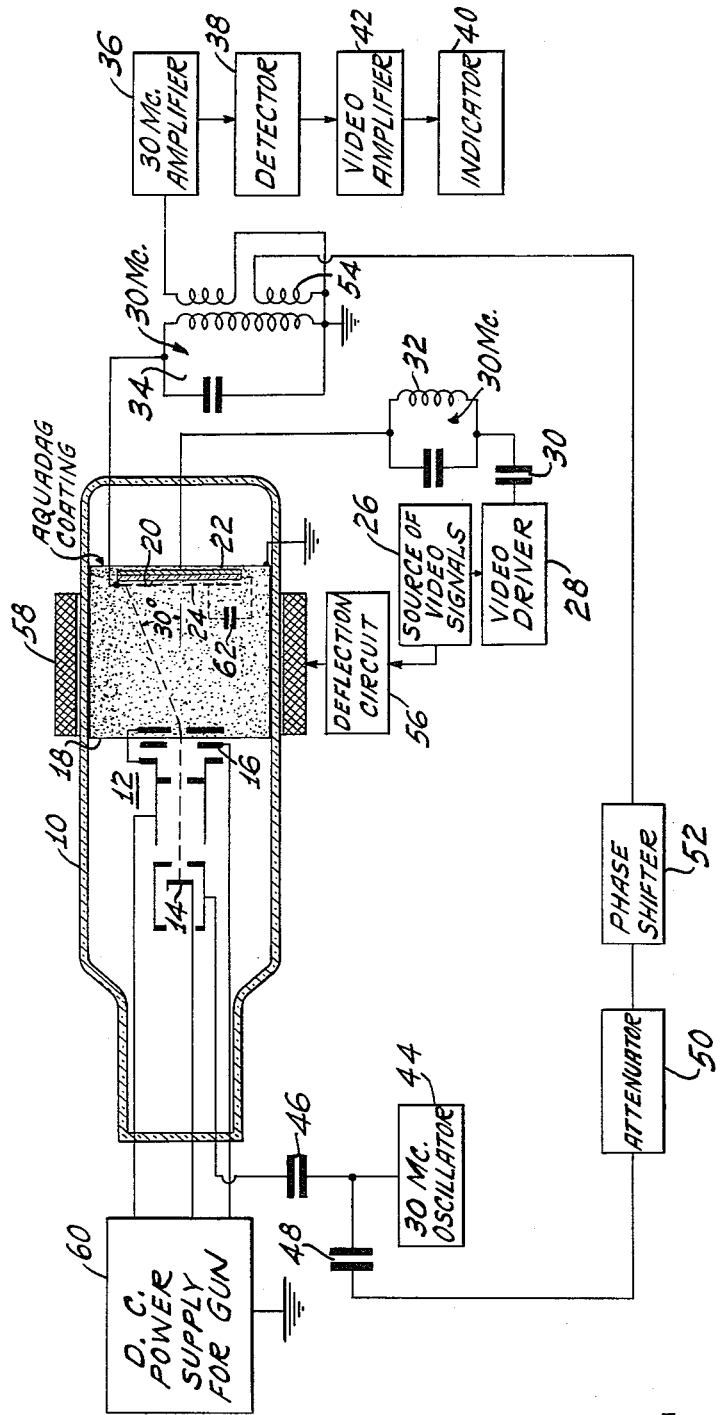
INVENTOR
*Louis Pensak*
BY
ATTORNEY

United States Patent Office 2,716,188
Patented Aug. 23, 1955

2,716,188

STORAGE TUBE AND CIRCUIT

Louis Pensak, Princeton, N. J., assignor to Radio Corporation of America, a corporation of Delaware Application October 31, 1950, Serial No. 193,187

5 Claims. (Cl. 250—27)

The present invention relates to the operation of storage tubes and more particularly storage tubes of the barrier grid type.

Heretofore, barrier grid storage tube operation has required the presence of a low capacity collector electrode between the barrier grid of the storage target and the electron gun. If this target is placed on the tube walls, its capacity to the conventional ground circuits becomes so great that the operation of the circuit when signal is taken from this collector electrode is considerably limited. When the electrode is spaced from the tube wall, the useful deflection angle is limited which in turn limits the resolution of the tube. When the collector electrode is spaced from the tube walls and made of smaller diameter or made of smaller length to reduce its capacity to ground, its efficiency of collection of electrons varies with respect to beam position. Some of the excess electrons are then collected more or less by other positive electrodes in the tube. Collector electrodes far removed from the target have not been completely satisfactory as signal output electrodes because of low efficiency.

It is an object of the present invention to improve the operation of barrier grid storage tubes.

Another object of the invention is to improve the resolution limit of barrier grid storage tubes.

A further object of the invention is to enable a different electrode than the collector electrode to be used as an output electrode, whereby the limitations inherent in the use of the collector as an output electrode are overcome.

A further object is to provide an improved circuit for the operation of a barrier grid storage tube.

These and other objects, advantages, and novel features of the invention will be more apparent from the following description when taken in connection with the accompanying drawing in which the sole figure is a representation of a barrier grid storage tube and a diagram schematically illustrating the circuit of the invention for operation of the tube.

According to the invention the electron beam is modulated at one preferably high frequency, a carrier frequency, and the input signals to be stored are applied to the signal electrode for the storage target at another preferably lower frequency. A trap circuit is interposed betwen the signal electrode and the low frequency input to the storage target. The carrier frequency output is taken from the barrier grid electrode through a second trap circuit. As will appear more fully hereinafter, unusually beneficial results flow from using the barrier grid as the output electrode, including high efficiency of operation and increased resolution. The trap circuits offer a high impedance between the parts of the tube to which they are connected for the carrier frequency so that the output signal consists of the carrier frequency voltage modulated by the low frequency signal of a non-overlapping frequency band which was stored, and the low frequency signal may be detected by demodulation. One feature of the invention includes means for coupling some of the carrier frequency input to the carrier frequency output so that sensing may be derived from the output signal at the detector. The polarity of the stored signal may then be determined. If the tube is operated as an internal differencing device, then the polarity of the previously stored low frequency signal compared with the low frequency signal currently being applied may be readily detected.

Referring now more particularly to the drawing, a barrier grid storage tube includes an envelope 10. Inside the envelope 10 is a cathode 14 and an electron gun 12 having as means to produce a beam of electrons from cathode 14. The gun 12 includes a voltage responsive beam current control means 16. A collector electrode 18 may consist of an aquadag or other conductive coating on the inner wall between an insulating target 20 and the gun 12. On the back of the target 20, that is, on the side remote from the gun 12 is a signal electrode 22. Between the gun 12 and the target 20 is a barrier grid electrode 24, preferably closely spaced to the target 20. The signals to be stored may arise at any suitable source 26 and are supplied to a video driver 28 which may be a suitable amplifier. The output of the video driver 28 is supplied to the signal electrode 22 through a capacitor 30 and a trap circuit 32. The trap circuit 32 in this case is a parallel tuned circuit having a resonant frequency at the carrier frequency, in this case of 30 megacycles per second. The signals from video driver stage 28 are presumed to lie within a frequency band of, for example, zero to 8 megacycles per second. The output electrode 24 is connected through a second trap circuit 34 (which is again a parallel tuned circuit resonant at 30 megacycles) to ground. The second parallel tuned circuit 34 is coupled inductively to a 30 megacycle amplifier 36 and thus through amplifier 36 to a detector 38. The output of the detector 38 is coupled to an indicator 40, if desired through a video amplifier 42. A 30 megacycle oscillator 44 is connected through the capacitor 46 to apply the carrier frequency 30 megacycle voltage to the beam current control electrode 16. The 30 megacycle carrier frequency oscillator 44 is also connected through a capacitor 48 and thence an attenuator 50 and a phase shifter 52 to an inductor 54 which is inductively coupled to the second trap circuit 34. Suitable deflection circuits 56 are supplied to the means 58 for deflecting the electron beam. In this case electromagnetic deflection coils 58 are provided for the purpose. The power supply 60 for the electron gun 12 is schematically shown. The collector electrode 18 is grounded. An interelectrode capacity 62 connects the barrier grid electrode 24 with the signal electrode 22, the interelectrode capacity 62 being solely the result of the close physical proximity of the two electrodes.

Construction and usual method of operation of barrier grid storage tube of the type shown are disclosed in the article by Jensen, Smith, Mesner, and Flory, entitled "Barrier Grid Storage Tube and Its Operation," published in the RCA Review, March 1948, volume IX, No. 1 starting at page 112. It will be understood that the principal manner in which the present tube differs from the tubes illustrated in the said publication is in the collector electrode which may be a coating on the tube walls. The tube herein illustrated is similar to that of Fig. 5 of the said publication except that electromagnetic deflection is employed, and the collector electrode is a tube wall coating.

In operation, the source of video signals 26 supply signals to the video driver stage 28, which amplifies them and applies them to the signal electrode 22. The impedance between the output of the video driver stage 28 through capacitor 30 and the tuned circuit 32 to the signal electrode 22 at video frequencies is low. Consequently, the video driver stage 28 drives the signal electrode 22 in accordance with the video signals. The impedance of interelectrode capacity 62 between the grid electrode 24 and the signal electrode 22 is comparatively low at the carrier frequency but so high at the modulating video frequencies that coupling is negligible at the video frequencies. The beam current control electrode 16 is biased by means (not shown) so that the 30 megacycle input applied by the 30 megacycle oscillator 44 causes the beam current to flow in 30 megacycle pulses. Thus each point on the target 20 is brought to the voltage of the collector electrode 18 in 30 megacycle pulses. As the electron beam scans some raster over the target 20, it therefore brings that point on the target 20 to a potential with respect to the electrode 22 which is representative of the applied video signal with respect to the ground bias on the signal electrode 22. On the next scansion of the target 20, if the video signal is not the same at the particular point as it was on the previous scansion, the beam puts down or takes up charge in 30 megacycle pulses. The charge pulses put down or taken up generate a 30 megacycle voltage on the target 20 which is capacitively coupled to the barried grid electrode 24 by the capacity 62. Thus, the 30 megacycle signal or carrier frequency output picked up by the barrier grid electrode 24 is modulated in accordance with the differencing of the input signal. The tube thus accomplishes internal cancellation and the difference signals, that is the difference between the signal written on one scan and the signal written on the next scan, is taken off as the modulation of a 30 megacycle signal. This carrier frequency output signal appears in the tuned circuit 34. The capacity of the tuned circuit may include the shunt capacity of the coil and any capacities from the leads or from the barrier grid electrode in parallel with the coil and may be nothing more. This modulated carrier frequency signal is coupled to the 30 megacycle amplifier 36 and detected in the detector 38. The detected difference signal may be amplified and applied to an indicator 40. If desired, the polarity of the difference signal may be determined by optional use of the inductor 54 which feeds a fixed R. F. level signal which preferably is either in phase at all times or out of phase at all times with the signal across the tuned circuit 34. The phase shifter 52 provides for suitable phase compensation and the attenuator 50 is provided to adjust the amplitude of the fixed level signal. If now the 30 megacycle beam current pulses must supply electrons to the target 20 (or take them off), the signals picked up at the tuned circuit 34 will be either in or out of phase with those supplied by inductor 54 (and vice versa). Accordingly, the output of the detector 38 is at a fixed D. C. level for no signal differencing and increases above or below it for positive or negative differencing. The indicator 40 may be of the type to show the polarity of the difference signal from the fixed level of detection. In other applications it may be desirable to dispense with the inductor 54 and utilize full wave rectification in the detector 38 so that the indicator 40 is always driven in one direction say, for example, to intensify the screen of a P. P. I indicator. In such case, of course, there should be a suitable connection between the deflection circuits and the indicator 40 (not shown). The invention is concerned, however, not with the application of the circuit illustrated to various problems, but to the circuit itself. It will be understood by those skilled in the art that the circuit illustrated has other usages besides those suggested.

The capacity 62 of the target 20 to the barrier grid 24 does not seriously limit the output of the tube since the impedance of the barrier grid 24 to ground is high because of the parallel tuned circuit 34. Therefore, the barrier grid 24 may be used as the output electrode. The collector electrode 18 may be directly connected to an appropriate D. C. voltage, for example, ground, and more advantageously may be physically situated on the tube walls out of the portion of the tube collectors which would limit the deflection of the beam walls. It will, therefore, be apparent that the circuit employing the barrier grid electrode as an output electrode allows the tube to be constructed in an advantageous manner and affords tube operation in a highly desirable fashion. The tube may now be constructed and successfully operated with an angle between extremes of the deflected electron beam axes of as great as 60°, whereas formerly 30° was the greatest angle possible, because larger angles were cut off by the collector grid. Now the collector grid may be spaced outside of a cone of a 30° half angle from the center 0 of beam deflection, between the electron beam gun and the target, and successful operation secured notwithstanding.

What is claimed is:

1. A circuit for operating a storage tube having a cathode, means to produce an electron beam from said cathode and including beam current control means, a target of insulating material toward which the beam is directed and on which electrical signals are stored, a signal electrode on the side of the target remote from the beam for receiving signals to be stored, a barrier grid interposed between the beam and the target, and a collector electrode; said circuit comprising, means for applying signals of a first predetermined frequency band to said signal electrode, said means including a first trap circuit to trap voltages of a second different and non-overlapping carrier frequency and thereby prevent loss of voltages of said carrier frequency at said electrode, means to apply a voltage of said carrier frequency to said beam current control means to control the beam current, and a second trap circuit connected to said barrier grid to trap signals of said carrier frequency, whereby the barrier grid may be employed as an output electrode.

2. A circuit for operation of a storage tube having a cathode, means to produce a directed beam of electrons from said cathode and including voltage responsive means to control the current of said beam, a storage target of insulating material against which said beam is directed, a barrier grid electrode between said cathode and said storage target, and a signal electrode on the side of said target remote from said cathode; said circuit comprising, means to impress signals of a first frequency on said signal electrode, a parallel tuned circuit resonant at a carrier frequency different from said first frequency and connected between said means to impress signals and said signal electrode, means to impress a carrier frequency voltage on said beam current control means, and a second parallel tuned circuit resonant at said carrier frequency connected to said barrier grid.

3. The circuit claimed in claim 2 further comprising an inductor inductively coupled to said second tuned circuit and connected to said carrier frequency voltage impressing means.

4. The circuit claimed in claim 3 further comprising a phase shifter connected between said carrier frequency voltage impressing means and said inductor.

5. The circuit claimed in claim 2 further comprising a detector coupled to said second parallel tuned circuit for detecting signals at said first frequency.

References Cited in the file of this patent

UNITED STATES PATENTS

| 2,241,204 | Keyston et al. | May 6, 1941 |
| 2,272,605 | Heising | Feb. 10, 1942 |
| 2,293,899 | Hanson | Aug. 25, 1942 |
| 2,340,742 | Gray | Feb. 1, 1944 |
| 2,503,949 | Jensen | Apr. 11, 1950 |
| 2,527,652 | Pierce | Oct. 31, 1950 |
| 2,548,789 | Hergenrother | Apr. 10, 1951 |